No. 778,647. PATENTED DEC. 27, 1904.
J. F. EWEN.
MANIFOLD COPIER.
APPLICATION FILED FEB. 24, 1903.

WITNESSES.
INVENTOR.

No. 778,647. Patented December 27, 1904.

UNITED STATES PATENT OFFICE.

JOHN FREDERICK EWEN, OF LIVERPOOL, ENGLAND.

MANIFOLD-COPIER.

SPECIFICATION forming part of Letters Patent No. 778,647, dated December 27, 1904.

Application filed February 24, 1903. Serial No. 144,638.

*To all whom it may concern:*

Be it known that I, JOHN FREDERICK EWEN, a subject of the King of Great Britain, residing at Liverpool, Lancaster county, England, have invented certain new and useful Improvements in Manifold-Copiers, of which the following is a specification.

This invention relates to producing manifold copies by transferring the writing in some anilin or copying ink from an ordinary sheet of paper to a slab or manifold copying-surface consisting of china-clay and other materials. The slabs hitherto made have the following disadvantages among others—namely, that the ink is liable to spread and fail to give a sharp copy and that even when the copy has dried on the paper it is not a fixed impression, but is liable to run with water and be smudged and obliterated. Also the printing-surfaces are soft or wabbly and the preparation of the surfaces for use again involves much trouble or mess. The present invention is, among other things, designed to avoid these defects. This is shown in the accompanying drawings, in which—

Figure 2:
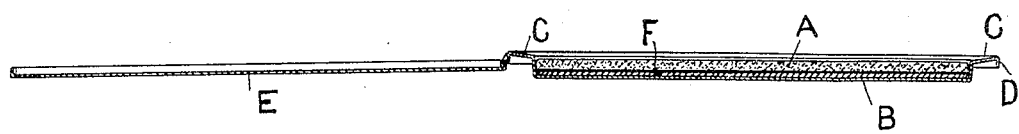
Figure 3:
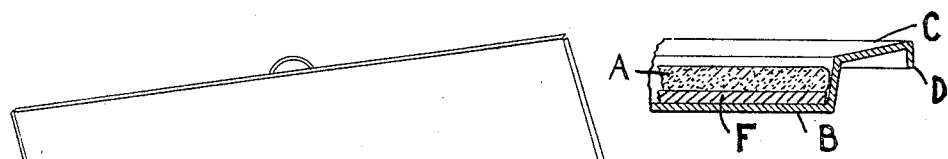
Figure 1:
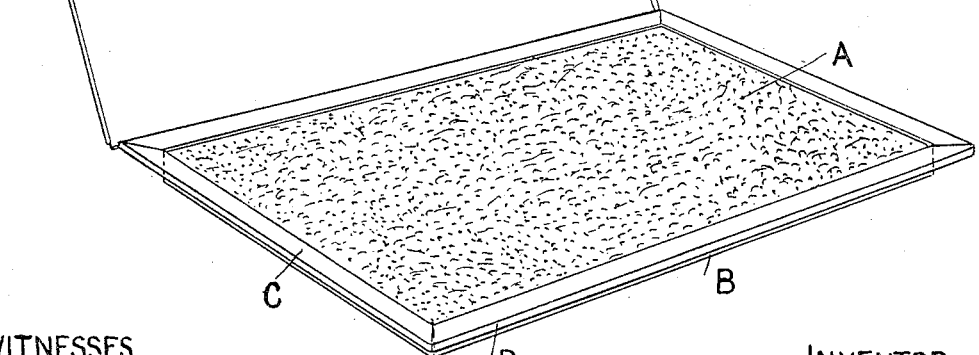

Figure 1 is a perspective view; Fig. 2, a cross-section; and Fig. 3, a fragmentary view, enlarged.

A is a slab; B, a tray with flanges C all round the sides sloping toward the slab A, so that when washing the slab the water will flow back into the tray instead of spilling over the sides. The edges of the flanges C may be beaded or turned over at D, if desired. E is a cover hinged to the tray, so as to form a lid for the slab when not required for use. F is a cardboard forming the base of the slab A. This device of tray obviates trouble and mess in preparing the surface for use again.

In carrying the invention into effect I employ pads or slabs consisting of a base of an absorbent material, preferably cardboard, which I cover with a composition of china-clay, starch, glycerin, water, &c., in the following proportions: China-clay, about twenty parts; starch, about six parts; glycerin, about six parts; water, about one and three-fourths parts; a strong solution of gum-arabic, about one-fourth to one part. I also add about one-half part of a mordanting chemical, known to dyers and calico-printers as "red liquor," which mainly consists of the acetate of alumina. This liquid may be prepared in a variety of ways and of different strengths, as described in books on dyeing and calico-printing. I have found the following to answer well: Dissolve one pound of alum and one pound of acetate of lead in two pounds of boiling water. A white precipitate, which is sulfate of lead, is thrown down. Allow the solution to settle and decant the clear liquid. It consists mainly of acetate of alumina, with the addition of sulfate of alumina and the alkaline sulfate contained in the alum. It is an advantage to have more alum than will just produce the decomposition of the acetate of lead. The excess of alum keeps the acetate of alumina in solution. The object of adding this chemical is to attract the ink from the writing on the original strongly into the composition of the slab and afterward yield it up and fasten it to the fiber of the paper used for taking the copies. When the ink has dried on the copy, it is indissolubly united with the fiber of the paper and will not wash out. Such mordanting ingredient is an important addition. Its use is well known to calico-printers, and, paper being similar in chemical composition to cotton, it is equally useful in the printing of paper; but so far as I know it has not been applied before in the making of copying compositions, consisting of china-clay, starch, and glycerin. The addition of the mordant also gives a much larger number of copies and they are more uniform. The mordant holds the color and yields it gradually. In other hectographic compositions the ink is given up too readily at first, producing some very strong copies to begin with; but further copies are much fainter, the ink having been prematurely exhausted. Also the mordant appears to give a certain crystalline structure to the composition, which makes it much firmer to resist pressure in taking sharp copies. Other compositions being pasty give way if much pressure is applied, so that it is impossible to reproduce straight lines solidly and accurately.

The gum-arabic is added for the purpose of preventing the ink spreading and to give a sharp copy. Gum-arabic is found to give much sharper and clearer impressions than dextrin, which is found to resist the penetration of the color, which lies on the surface and is given up too rapidly. Also since gum-arabic tends to dry in a crystalline form it gives a firmer texture to the composition.

To transfer the original to the slab, the paper with the writing face downward is laid gently on the slab and rolled over with an india-rubber roller first gently and then firmly. In a very short space of time when the ink has been absorbed by the composition the original is peeled off. To take copies, a clean sheet of paper with a smooth surface is rolled on the slab, and the ink writing is yielded up onto the paper. After a moment's contact the paper is peeled off, and when the copy is dry on the paper the ink becomes impregnated in the fiber of the paper in an insoluble state and cannot be washed out. The copy is a brilliant facsimile reproduction of the original as sharp and clear as by lithography.

In order to obtain a firm consistency of the slab, I apply pressure to the slab by means of a roller or rollers in order to squeeze out air and liquid by means of a rolling pressure, the absorbent material taking up the moisture. By this means a slab with a hard level surface is produced, which is greatly superior to the slabs hitherto produced.

For the convenience of washing the slab I place it in a shallow tray.

Having thus described my invention, what I claim as new, and desire to secure by Letters Patent, is—

A manifold-copying surface, consisting of a composition of china-clay, starch, glycerin, and water in about the proportions specified, to which is added a strong solution of gum-arabic to give a sharp impression, and a mordanting chemical, known to dyers and calico-printers as "red liquor," which mainly consists of the acetate of alumina, substantially as and for the purpose set forth.

In witness whereof I have hereunto signed my name, this 13th day of February, 1903, in the presence of two subscribing witnesses.

JOHN FREDERICK EWEN.

Witnesses:
G. C. DYMOND,
F. P. EVANS.